United States Patent
Cocconi

[11] Patent Number: 6,018,224
[45] Date of Patent: Jan. 25, 2000

[54] ANTI-CLIPPING CIRCUIT FOR INDUCTION MOTOR DRIVE SYSTEM

[75] Inventor: Alan G. Cocconi, Glendora, Calif.

[73] Assignee: AC Propulsion, Inc., San Dimas, Calif.

[21] Appl. No.: 08/029,028

[22] Filed: Mar. 10, 1993

[51] Int. Cl.$^7$ ...................................................... H02P 5/40
[52] U.S. Cl. ........................ 318/798; 318/806; 318/807; 318/811; 318/432
[58] Field of Search .................... 318/727–832, 318/138, 254, 638; 363/71, 165, 98, 90, 91

[56] References Cited

U.S. PATENT DOCUMENTS

| | | | |
|---|---|---|---|
| 3,577,050 | 5/1971 | Ringland | 318/146 |
| 3,983,463 | 9/1976 | Nabae et al. | 318/227 |
| 4,019,105 | 4/1977 | Cornell et al. | 318/227 |
| 4,041,361 | 8/1977 | Cornell . | |
| 4,322,671 | 3/1982 | Kawada et al. | 318/798 |
| 4,469,997 | 9/1984 | Curtiss et al. | 318/729 |
| 4,503,375 | 3/1985 | Okuyama | 318/802 |
| 4,509,004 | 4/1985 | Shepard | 318/801 |
| 4,543,520 | 9/1985 | Danz et al. | 318/807 |
| 4,625,159 | 11/1986 | Ikejima | 318/811 |
| 4,689,543 | 8/1987 | Hucker | 318/798 |
| 4,727,305 | 2/1988 | Muskovac et al. | 318/798 |
| 4,780,650 | 10/1988 | Miyazaki et al. | 318/798 X |
| 4,912,378 | 3/1990 | Vukosavic | 318/254 |
| 4,920,475 | 4/1990 | Rippel . | |
| 5,099,186 | 3/1992 | Rippel et al. . | |

*Primary Examiner*—Paul Ip
*Attorney, Agent, or Firm*—Blakely, Sokoloff, Taylor & Zafman LLP

[57] ABSTRACT

A feedback circuit prevents clipping of the inverter drive signals for a polyphase induction motor. The circuit senses the electromotive force (e.m.f.) of the motor and regulates the slip frequency as a function of the difference between the sensed motor e.m.f. and the DC power supply voltage. When the motor e.m.f. approaches the supply voltage, a voltage controlled oscillator adjusts the slip frequency to reduce the motor e.m.f. and thereby ensure that the motor drive waveforms are not distorted.

7 Claims, 1 Drawing Sheet

ANTI-CLIPPING CIRCUIT FOR INDUCTION MOTOR DRIVE SYSTEM

BACKGROUND OF THE INVENTION

1. Field of the Invention

This invention relates generally to the field of control electronics for an induction motor, and particularly to a circuit for controlling the slip frequency of the motor to eliminate clipping of the AC motor drive signals throughout the operating range of the motor.

2. Background Art

Induction motors commonly employ an electronic power inverter to convert DC voltage from a power source, such as a battery, to AC voltage/current for energizing the motor windings. Motors of this type may be used in either fixed speed or variable speed drives. Applications for such drives are widespread and include electric vehicles and industrial process drives.

FIG. 1 illustrates a typical motor control circuit for a three-phase induction motor 10. A three-phase power inverter, shown generally as 12, comprises an array of solid state switches S1–S6, which are typically power transistors, arranged in a bridge configuration. Energy is supplied to the power inverter from a voltage source, such as battery 14. Control electronics 16 provide a control signal to each of the inverter switches to modulate the drive signals applied to the motor windings. Typically, the drive signals are pulse width modulated at a switching rate on the order of 20 kHz to produce sinusoidal current waveforms across the motor windings with amplitude and frequency so as to produce the desired speed and torque from the motor. Inputs to control electronics 16 include the sensed rotor speed of the motor and a slip frequency, which is the difference between the rotor frequency and the frequency of the rotating magnetic field generated by the currents in the stator windings.

Regulation of the motor drive signals is achieved by varying the duty cycle of the switch pairs S1/S2, S3/S4 and S5/S6. The peak amplitude of the output voltage is limited by the DC input voltage supplied by battery 14. If the commanded speed and torque are such that the motor controller seeks to develop an output voltage greater than can be supplied by maximum modulation by the drive signals (i.e., 100% duty cycle), the voltage waveforms of the motor drive signals are distorted from the optimum sinusoidal waveforms with the peak voltage "clipped" at the DC input voltage level. Clipping of the output voltage causes reduced motor efficiency, increased torque pulsation and potential instabilities. These detrimental effects are caused by the introduction of high frequency components in the drive signal waveform.

In order to avoid such effects, some prior art motor drive systems implement a slip frequency control algorithm to prevent clipping. Such an algorithm seeks to decrease the effective impedance of the motor by adjusting the slip frequency at high commanded currents so that the peak voltage is held below the DC input voltage. An increase in the slip frequency will decrease the effective impedance of the motor. However, since the impedance of the motor varies not only with slip frequency, but also with the motor speed, current level and temperature, a typical prior art anti-clipping algorithm, which is intended to avoid clipping under extreme conditions, will have a substantial margin of safety throughout much of the operating range of the motor. This margin results in less than maximum modulation in certain cases where full power is desired. Thus, the maximum power output of the motor may be needlessly limited in portions of its operating range.

SUMMARY OF THE INVENTION

The present invention provides a circuit for preventing clipping of the motor drive signals produced by a polyphase inverter. The circuit senses the peak output voltage of the drive, which is also referred to as the peak electromotive force (e.m.f.) of the motor, and regulates the slip frequency as a function of the difference between the sensed motor e.m.f. and the DC power supply voltage. For any given commanded current, the output voltage can be decreased by increasing the value of the slip frequency. The inverter can thus operate at maximum modulation anywhere in the operating range of the motor without clipping the output voltage sine wave. This allows maximum power output and efficiency over the entire operating range.

The circuit of the present invention receives signals proportionate to each of the motor phase voltages. The peak phase voltage is detected by a three-phase rectifier, thereby providing a measure of the motor e.m.f. This signal is compared with the DC power supply voltage. When the motor e.m.f. approaches the supply voltage, a voltage controlled oscillator adjusts the slip frequency to reduce the motor e.m.f. and thereby ensure that the motor drive waveforms are not distorted.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
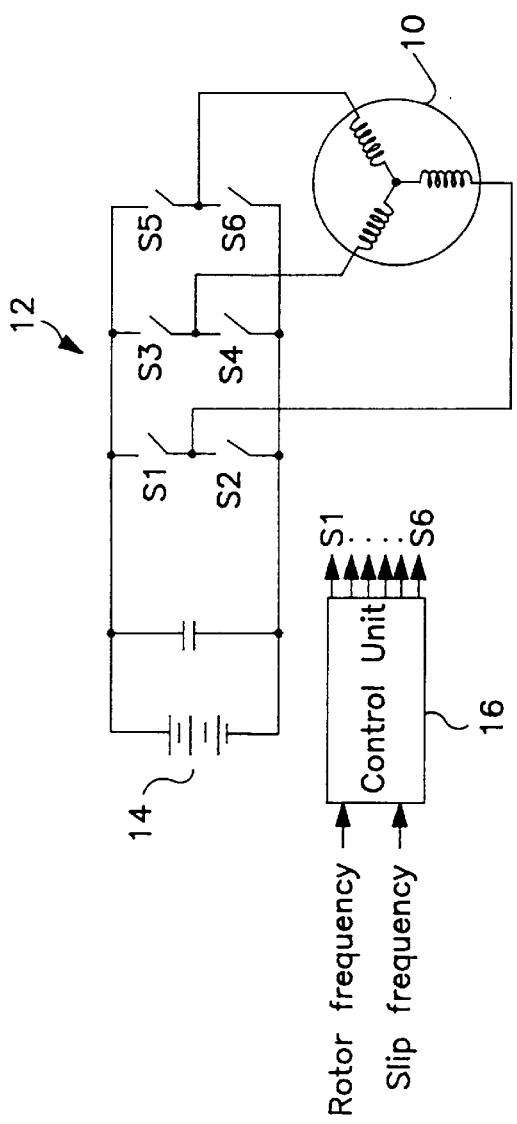
FIG. 1 illustrates a conventional inverter drive circuit for a three-phase induction motor.
Figure 2:
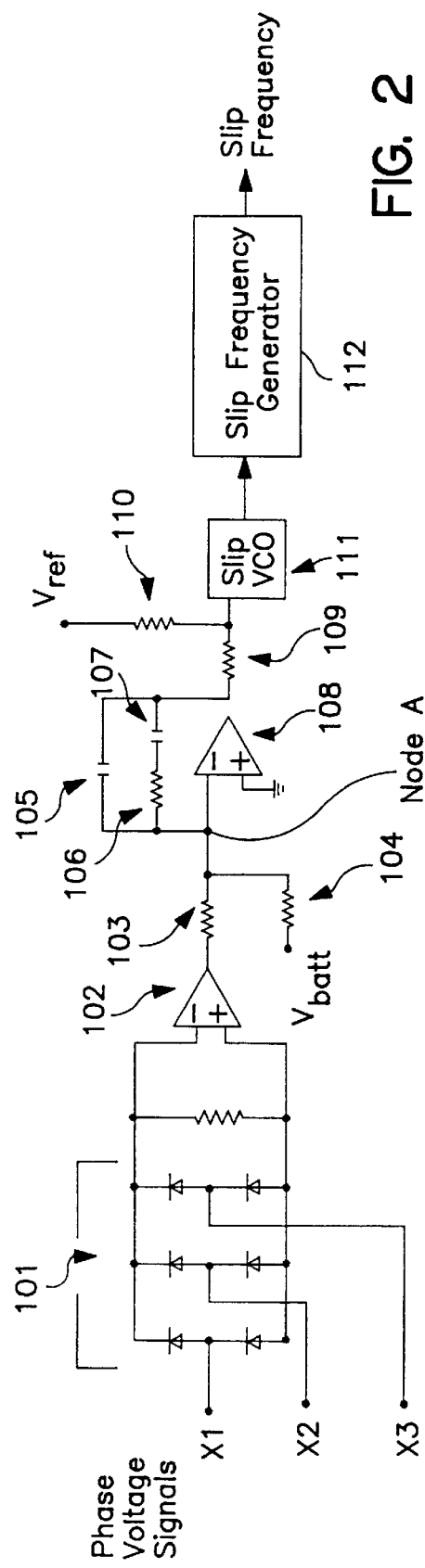
FIG. 2 is a schematic diagram of an anti-clipping circuit according to the present invention.

A schematic diagram of an anti-clipping circuit according to the present invention is shown in FIG. 2. Broadly speaking, the circuit comprises a feedback loop for sensing the phase voltage signals of motor 10, developing a signal representative of the motor e.m.f., comparing the motor e.m.f. to the battery voltage $V_{batt}$ and adjusting the slip frequency so as to reduce the motor e.m.f. as it approaches $V_{batt}$.

Phase voltage signals from each of the motor windings are received as inputs X1, X2 and X3. These signals are asserted at three-phase rectifier 101 which detects the peak phase voltage. The output of differential amplifier 102 is thus proportionate to the peak motor e.m.f. The output of amplifier 102 and the battery voltage $V_{batt}$ are applied to the voltage divider comprising resistors 103 and 104. Under normal operating conditions, the peak motor e.m.f. remains well below the battery voltage, and thus the voltage at circuit node A is dominated by $V_{batt}$. This causes operational amplifier 108 to remain in negative saturation, i.e., with its output clamped to the negative supply voltage. The network of resistors 109 and 110 establish a quiescent control voltage at the input to voltage controlled oscillator (VCO)111, the output of which is applied to slip frequency generator 112. As is known in the art, slip frequency generator 112 may be conveniently implemented as a digital look up table, the contents of which are selectively clocked out at a rate established by the output of VCO 111.

As the peak motor e.m.f. approaches $V_{batt}$, circuit node A is allowed to approach ground potential and operational amplifier 108 comes out of negative saturation. With amplifier 108 in its linear region, the input voltage to voltage controlled oscillator 111 increases, thereby increasing the frequency of the output signal. This, in turn, acts to increase the slip frequency provided by slip frequency generator 112. Increasing the slip frequency reduces the effective impedance of the motor, and thus for any commanded current the motor e.m.f. is reduced, thereby preventing voltage clipping of the inverter power signals.

Although the foregoing description of the invention has been in terms of an analog electrical circuit for generating the slip correction signal, it will be appreciated that the invention may be alternatively embodied in computer software.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. An anti-clipping circuit for a polyphase electric motor driven by a polyphase inverter with the polyphase inverter receiving electrical power from a power supply and generating motor drive signals phase currents that are a function of a rotor frequency and a slip frequency, said anti-clipping circuit comprising:

first sensing means for sensing an electromotive force of the motor;

second sensing means for sensing a voltage of the power supply;

comparison means coupled to the first and second means for comparing the electromotive force of the motor with the power supply voltage and producing a comparison output that varies as a function of a difference between the electromotive force of the motor and the power supply voltage; and slip correction means for adjusting the slip frequency as a function of the comparison output to progressively increase the slip frequency as the electromotive force of the motor approaches the power supply voltage.

2. The anti-clipping circuit of claim 1 wherein the first sensing means comprises a polyphase rectifier coupled to a plurality of phase voltage signals each of which represents a voltage in a respective phase of the polyphase motor.

3. The anti-clipping circuit of claim 1 wherein the comparison means comprises a voltage divider network.

4. The anti-clipping circuit of claim 1 wherein the slip correction means comprises a voltage controlled oscillator.

5. The anti-clipping circuit of claim 4 wherein the slip correction means further comprises an operational amplifier for providing an output voltage to control the voltage controlled oscillator.

6. A method of controlling a polyphase electric motor of the type that receives motor drive signals phase currents from a polyphase inverter, said polyphase inverter receiving electrical power from a power supply and generating the motor drive signals phase currents as a function of a rotor frequency and a slip frequency, said method comprising the steps of:

sensing an electromotive force of the motor;

sensing a voltage of the power supply;

comparing the electromotive force of the motor with the power supply voltage and generating a comparison output that varies as a function of a difference between the electromotive force of the motor and the power supply voltage; and adjusting the slip frequency as a function of the comparison output to progressively increase the slip frequency as the electromotive force of the motor approaches the power supply voltage.

7. The method of claim 6 wherein the slip frequency is adjusted as a function of the comparison output only when the difference between the electromotive force of the motor and the power supply voltage is less than a predetermined value.

* * * * *

UNITED STATES PATENT AND TRADEMARK OFFICE
CERTIFICATE OF CORRECTION

PATENT : 6,018,224
DATED : January 25, 2000
INVENTOR(S) : Cocconi

It is certified that error appears in the above-identified patent and that said Letters Patent is hereby corrected as shown below:

Item [56], References Cited, in patent number 4,4041,361, please insert the class number -- 318 --.

Signed and Sealed this

Fifteenth Day of May, 2001

Attest:

NICHOLAS P. GODICI

Attesting Officer

Acting Director of the United States Patent and Trademark Office